(No Model.)

A. G. OSGOOD.
VALVE.

No. 584,291. Patented June 8, 1897.

Witnesses:
J. W. Garfield
K. I. Clemons

Inventor:
Alfred G. Osgood
by Chapin &c.
Attorneys.

UNITED STATES PATENT OFFICE.

ALFRED G. OSGOOD, OF ATHOL, MASSACHUSETTS, ASSIGNOR OF ONE-HALF TO ROY C. OSGOOD, OF SAME PLACE.

VALVE.

SPECIFICATION forming part of Letters Patent No. 584,291, dated June 8, 1897.

Application filed July 22, 1896. Serial No. 600,146. (No model.)

*To all whom it may concern:*

Be it known that I, ALFRED G. OSGOOD, a citizen of the United States of America, residing at Athol, in the county of Worcester and State of Massachusetts, have invented new and useful Improvements in Valves, of which the following is a specification.

This invention relates to valves, and particularly to "straightway" valves, so called, having a valve-seat located at an angle across the valve-body, the object of the invention being the improved construction of certain parts of the valves, as will be hereinafter fully described, and pointed out in the claims.

Figure 1:
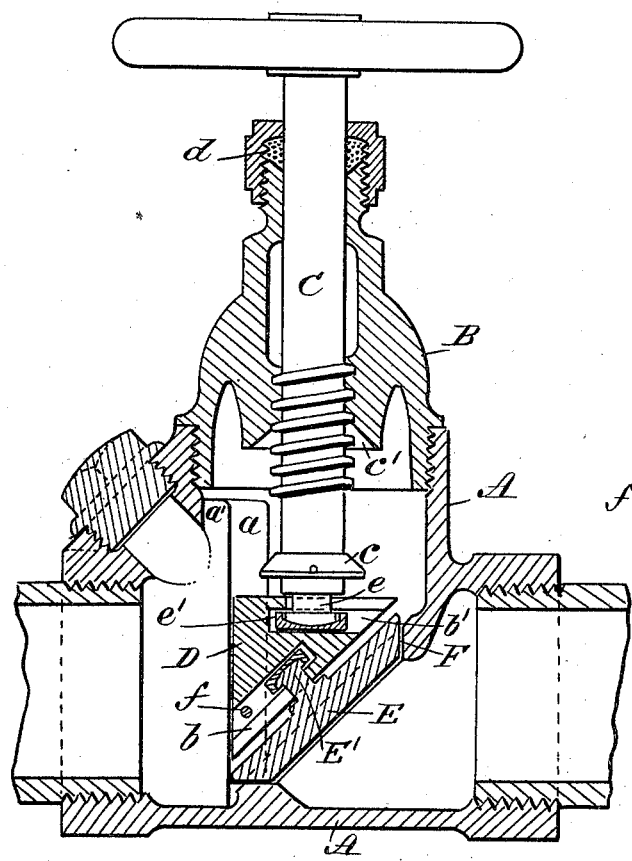
Figure 3:
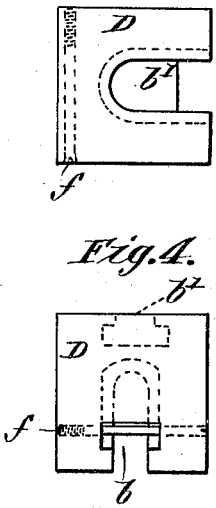
Figure 4:
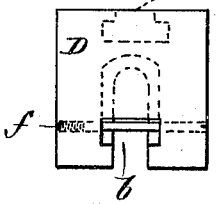
Figure 5:
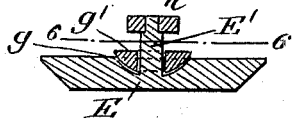
Figure 2:
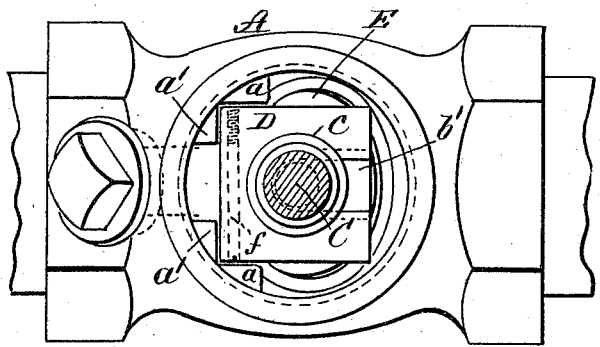
Figure 6:
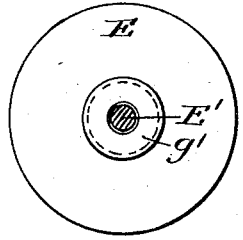

In the drawings forming part of this specification, Figure 1 is a vertical section through the valve-body and certain of its parts. Fig. 2 is a top plan view of the valve-body with the cap or bonnet removed and showing the valve-spindle in section. Fig. 3 is a top plan view of the valve-carrier. Fig. 4 is an elevation of the same. Fig. 5 is a sectional view of the valve-disk. Fig. 6 is a plan view of the same.

In the drawings, A is the valve-body, of the usual form in valves of this class, and is provided with the valve-seat F therein and the bonnet or cap B, through which the valve-spindle C passes, and on the end of said valve-spindle is the wedge-shaped valve-carrier D, carrying on the face thereof, which is parallel to the valve-seat F, the valve-disk E, loosely supported in a T-shaped slot $b$ in said face. (See Figs. 1 and 4.) On said spindle C, near the lower end thereof, is fixed a collar $c$, with an upwardly-tapering face, constituting a valve which is made to closely fit into the annular tapered valve-seat $c'$ provided therefor in the body of the bonnet, as shown in Fig. 1. The object of this valve on the spindle is for the purpose of preventing the steam or water from finding an outlet around the spindle when it is desired to replace the packing around said spindle contained in the gland $d$, thereby obviating the necessity of shutting off the steam or water from the pipes to which the valve A is attached when said valve-spindle is to be packed. In the valve-spindle C, below said collar $c$, is turned an annular groove $e$, and the end of the spindle below said groove is provided with a spherical end which has a bearing in a washer or shoe $e'$, provided with a concavity for the reception of the rounded end of said spindle.

In the upper surface of the valve-carrier D is provided a slot $b'$, (T-shaped in cross-section,) the narrowest portion of which admits freely that portion of the valve-spindle comprised between the edges of the annular slot $e$, while the widest portion of said T-slot $b'$ freely admits the washer or shoe $e'$, in which is stepped the end of the spindle C. The valve-carrier D is therefore supported by said spindle and has a free movement therein in the direction of the slot $b'$.

The purpose of the washer or shoe $e'$ in which the end of the spindle is stepped is to provide a larger bearing-surface to receive the thrust of said spindle when it is screwed down to close the valve, and the said shoe, having a bearing on the bottom of the slot $b'$ in the carrier D, entirely relieves the spindle from wear at any other point, and when any wear takes place between said shoe and the end of the spindle a new shoe can be easily and quickly inserted therein.

The valve-carrier D on the end of the spindle C is guided in its downward movement to close the valve by two vertical ways $a, a$ $a' a'$ within the valve-body, which fit the two corners of the valve-carrier D, (clearly shown in Fig. 2,) the sides $a' a'$ of said ways serving as an abutment against which the said carrier D impinges to firmly apply the valve E to its seat F. The said valve E is attached to the inclined face of the carrier D by the same means, as above described, by which the carrier is attached to the spindle C and for the same purpose, said slot $b$ in the carrier being identical to slot $b'$ in the upper surface of the carrier.

Instead of the stem $E'$ of the valve E being rounded on the end thereof and stepped in a shoe or washer within the slot $b'$ the construction shown in Figs. 5 and 6 may be employed. This construction consists in turning a groove $g$ in the top of the valve E around the base of the stem $E'$ for the reception of a washer $g'$, one face of which is spherical and fits into the groove $g$, which is of like form, as shown in Fig. 5.

The top of the washer projects above the upper surface of the valve somewhat and fits loosely on the stem E of the valve, in order that when the valve is screwed down to a bearing in its seat all the thrust of the valve-carrier D may be received on said washer $g'$, the spherical side of which, resting in the spherical groove $g$, permits the said carrier and valve to adjust themselves one to the other with ease. When this construction is used, the shoe on the end of the stem of valve E is omitted and a washer $h$ is riveted to the top of said stem, as shown in Fig. 4, which serves to retain the valve-disk in the groove $b$ and prevents the washer from disengagement with the stem. Through the body of the carrier D, in such position that it passes through said slot $b'$, is a screw $f$, which retains the said valve E within the slot $b'$ when the parts are withdrawn from the body of the valve.

It will be seen that the construction herein described provides for the perfect adjustment of the carrier D on the valve-stem and of the valve-disk E between the carrier and the inclined valve-seat.

Having thus described my invention, what I claim, and desire to secure by Letters Patent, is—

1. In combination with the body and spindle of a steam or other valve, a valve-carrier D, on said spindle, a valve E, on said carrier provided with the stem $E'$, and a washer having a bearing on said carrier interposed between said valve and valve-carrier, substantially as described.

2. In combination with the body and spindle of a steam or other valve, a valve-carrier D, having the slots $b$, $b'$, therein, said spindle having a loose engagement with said slot $b'$, and the valve E, having a loose engagement with said slot $b$, a washer interposed between the valve E, and said carrier and having a bearing on the latter, and a screw $f$, in said carrier and extending across said slot $b$, whereby the valve E, is retained in said slot, substantially as described.

3. In combination with a steam or other valve-body having an inclined seat, of the spindle C, valve-carrier D, triangular in cross-section, vertical guideways $a$ and $a'$, for said valve-carrier in said valve-body, slots $b$ and $b'$, in said carrier, for engagement, respectively, with the stem $E'$, of the valve E, and the end of said spindle C, and a screw $f$, in said slot $b$, whereby the valve E, is retained in said slot $b$, substantially as described.

ALFRED G. OSGOOD.

Witnesses:
W. H. HERVEY,
J. HOWARD PAYLOR.